July 16, 1968  E. L. CHRISTIAN  3,393,023
FRICTIONLESS SUPPORT SYSTEM FOR VERTICAL SHAFT
Filed April 8, 1966  2 Sheets-Sheet 2

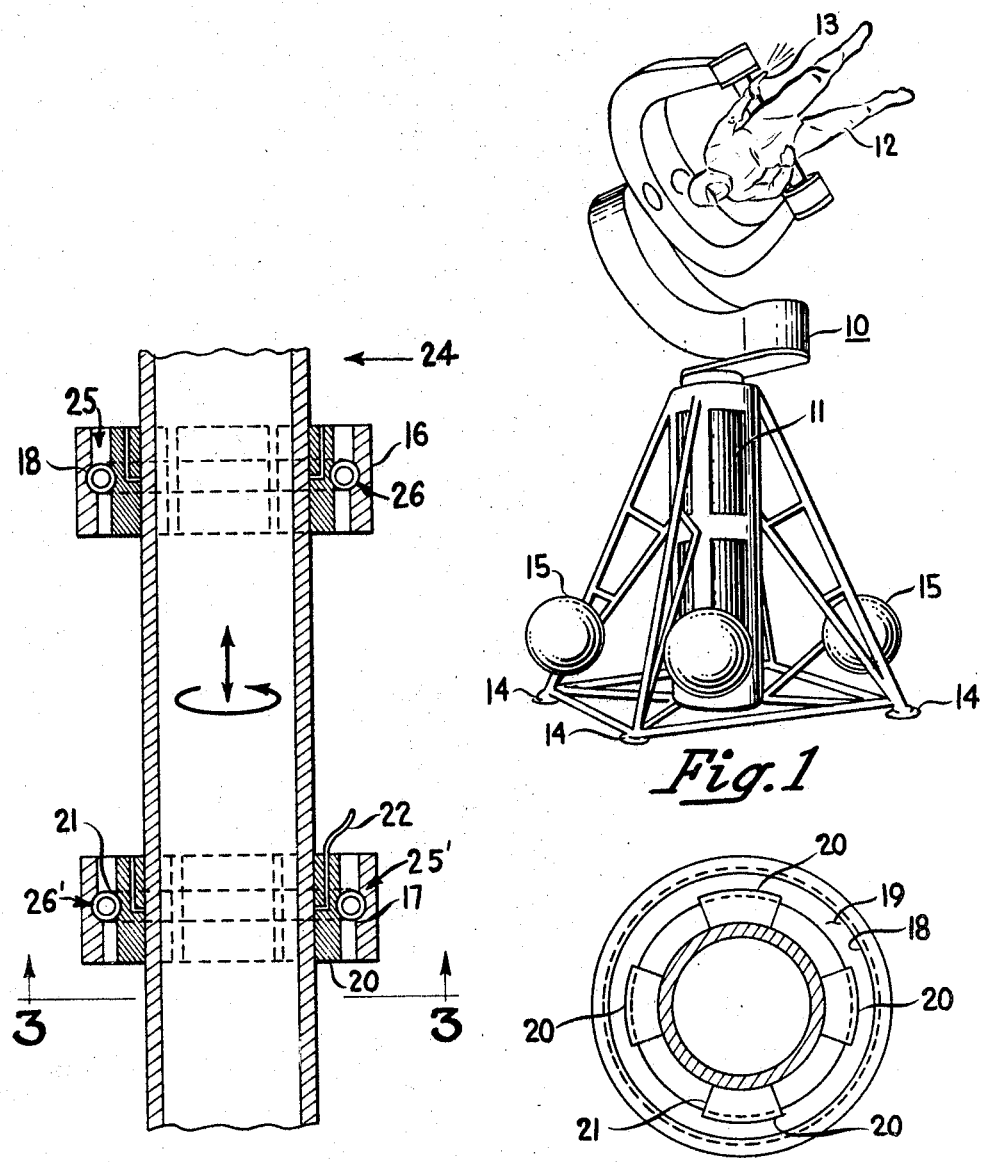

INVENTOR.
EARL L. CHRISTIAN
BY
AGENT

United States Patent Office 3,393,023
Patented July 16, 1968

3,393,023
FRICTIONLESS SUPPORT SYSTEM FOR VERTICAL SHAFT
Earl L. Christian, San Diego, Calif., assignor to General Dynamics Corporation, San Diego, Calif., a corporation of Delaware
Filed Apr. 8, 1966, Ser. No. 541,257
10 Claims. (Cl. 308—73)

This invention relates to a frictionless support system for a shaft but more particularly to a frictionless self-aligning support for a substantially vertically positioned moving shaft.

In various mechanical apparatus, where a vertical positioned shaft or cylinder is involved, for vertical and/or rotational freedom of motion, it is most desirable that the shaft would be unaffected in its rotation or vertical motion, caused by loads acting thereon. Thus, the present invention provides a frictionless support system and bearing arrangement wherein the supporting bearing elements are unaffected by expansion, contraction, deflection or minute undulations in the surface of the shaft or cylinder. The bearings employed in this system are air bearings which seek their own alignment and are frictionless in nature, as is well known in the art. However, in addition thereto, a second self-aligning feature for each bearing as well as a vertical aligning feature for the shaft is employed by an additional element which acts as a supporting means to the air bearings.

In general, the structure of frictionless vertical support for an elongated member providing linear vertical motion and 360° freedom of rotation, comprises, a support means, a resilient means and a plurality of air bearings. The support means carries at least two concentrically vertically spaced frames. A resilient means is disposed at each of the frames' inner periphery. A plurality of air bearings are pivotally supported by the resilient means in a spaced arrangement along the inner periphery of the frames. The elongated member or shaft is positioned within said spaced arrangement of air bearings and frictionless supported for vertical movement by said air bearings. The resilient means pivotally hold each air bearing so that loads acting upon said elongated member cannot cause misalignment between said air bearings and elongated member, because the air bearing is able through its pivotal mounting to follow the surface of the elongated member. Also the resilient means acts against the direction of the applied side or deflection load thus tending to correct an off-vertical position of the vertical positioned elongated member.

It is, therefore, one important object of this invention to provide an aligning system for an air bearing assembly in order to maintain a vertical shaft in the vertical position.

It is another object of the present invention to provide a vertical support structure for a vertical positioned shaft wherein the bearing system seeks its own alignment as the shaft moves up or down and rotates.

It is another object of the present invention to provide a support structure with bearing wherein the bearings are held around the shaft by a pressurized flexible O-ring which causes self-centering for the shaft and self-aligning for the bearings.

It is another object of the present invention to provide an adjustable resilient means for counteracting loads to the shaft and having means to increase the pressure in the resilient means for overload situations.

A further object of the present invention is to provide a resilient means in a bearing support structure for a vertical positioned shaft wherein the shaft is unaffected by expansion, contraction, deflection or minute undulations in the surface of the shaft.

The attached drawings illustrate the preferred embodiment of the invention, in which:

FIGURE 1, is a perspective illustration of a space simulator for a man-carrier test device with six degrees of freedom.

FIGURE 2 is a section view taken from the vertical shaft, used in the simulator, supported by air bearings carried by two self-aligning balancing resilient means supported by two frames.

FIGURE 3 is a cross-section taken along line 3—3 in FIGURE 2.

Figure 4:
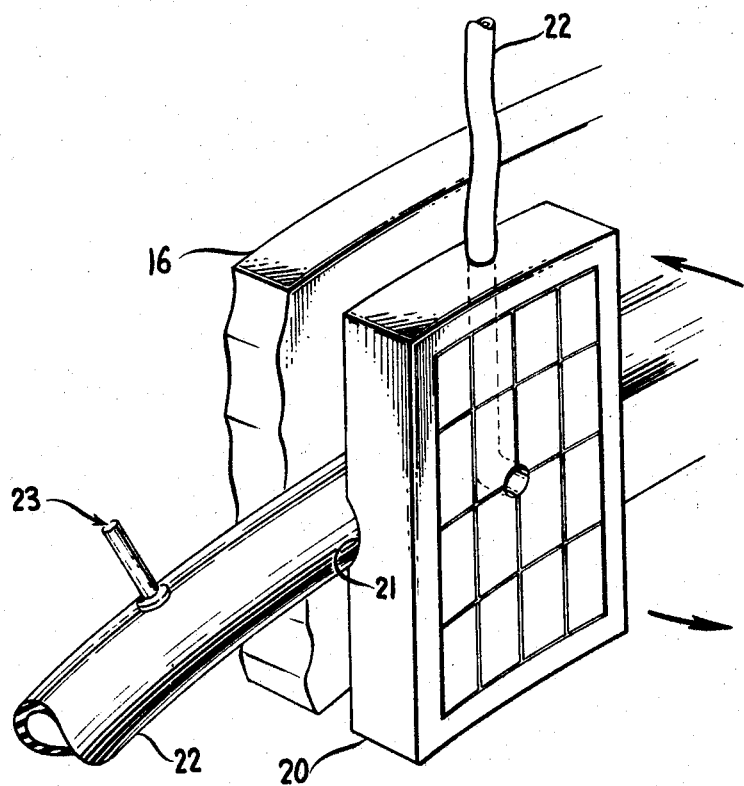
FIGURE 4 is a perspective view illustrating one air bearing segment carried by a pressure controlled tube being part of the vertical shaft frictionless aligning assembly.

Referring further to the drawings, wherein like reference characters designate corresponding parts throughout the several views, there is shown in FIGURE 1, a space simulator 10 having six degrees of freedom, which enables a man 12 to tumble nearly weightless as in free space flight. One of the major requirements in designing such a simulator was the development of a perfect vertical shaft 11 with frictionless vertical movement and frictionless rotational movement to the space walker 12 carrying a hand-propulsion activator 13 or the like. The simulator 10 which rests on four air bearings 14 is provided with air pressure tanks 15 and is able to move in all directions on a near perfect horizontal floor by the power of hand propulsion activator 13 carried by the space walker 12. However, while FIGURE 1 is mainly intended to show an application for an exactly positioned vertical shaft 11 having side and bending loads, similar applications requiring a frictionless vertical member or shaft are legion.

In FIGURE 2 is a section view of the shaft 11 illustrated, wherein two vertically concentrically positioned circular free members 16 and 17 are shown, which are mounted to the simulator 10 structure at spaced locations. Each frame member 16 or 17 has a vertical indentation or groove 18 in its inner periphery in which rests a tube 19 of a rubber material or the like. A plurality of air bearings 20 are provided with a groove 21 or other means for pivotal support on the tube 19. Each air bearing has a flexible connection 22 to a main air pressure line (not shown).

In FIGURE 3 the tube 19 holds four air bearings 20, and each air bearing 20 rests with its face against the shaft 11 when the air pressure is turned off.

In FIGURE 4 there is shown in perspective fashion the inflatable tube 19 with a pressure valve 23 for providing a required amount of fluid pressure thereto. The air bearing segment 20 is pivotally supported by the vertical positioned tube 19.

The operation of the vertical positioned shaft and its self-aligning system is as follows: Eight air bearing segments are positioned around the circumference of the shaft or cylinder. Four are inside the upper frame 16 of the structure and four inside the lower frame 17 of the structure. An inflatable rubber O-ring locks the air bearing segments 20 tight to the cylinder or shaft 11. Air under pressure is forced into the bearings 20, thus developing a thin film of air between the bearing interface and the cylinder or shaft 11. The rubber O-ring 19, is slightly resilient which allows the air bearing segments 20 to seek their own alignment. Depending upon the amount of side loads or deflection acting upon the shaft 11 more or less pressure can be supplied to the resilient tube 19 through valve 23. The coefficient of friction in this system is proven to be below .00001. Assuming that a load acts upon the shaft 11 from the side top portion of the cylinder (see arrow 24), the tube 19, in the upper frame 16, will be compressed at one side (arrow 25) and expanded at the opposite side (arrow 26). At the lower frame 17 the tube 19 will act in opposition to the above compression and expansion of the upper tube (indicated by arrow 25' for compression and 26' for expansion). The expanded tube sections 26 and 26' will tend to decompress by pushing the fluid to the inflated side 25 and 25' thereby acting against the load force 24 which tries to tilt the shaft or cylinder 11. Therefore, depending upon the pressure contained in the resilient means or tubes 19 any expected amount of loads or deflection acting upon the shaft 11 can be counteracted and thus a near perfect vertical position be maintained at all times. The air bearings 20 will maintain a frictionless and even pressure with the surface of the shaft 11 by their pivotal support which allows them limited movement along a horizontal axis provided by the tube 19, so that the coefficient of friction is maintained at all times. Expansion or contraction of the shaft or cylinder 11 does not affect the alignment while minute undulations in the surface of the cylinder are also taken care of.

In short, this system provides the unique features of (a) the natural self-alignment feature of each air bearing, (b) a self-alignment feature between the shaft and the air bearing by the limited horizontal pivotal movement allowed to the air bearings, (c) continuous self-centering of the shaft by the force provided by the tube, (d) counteracting side loads and deflection loads by the pressure thrust of the tube, (e) the ability of varying the fluid pressure in the tube to accommodate increased loads, and (f) the ability of the bearings to move "in and out" as the structure or shaft expands or contracts due to temperature changes.

And as additional features it can be stated that the bearings are allowed to support the shaft freely, even though the shaft is not perfectly round, parallel or has undulating or tapering surfaces. The requirements for precise machining, as is normally the case for an air bearing shaft, can be eliminated which is a substantial cost saving feature.

Having thus described the invention in the present embodiment, it is desired to emphasize the effect that many other modifications may be resorted to in a manner limited only by a just interpretation of the following claims:

I claim:
1. A structure for frictionless support of an elongated member comprising in combination:
 (a) support means carrying a plurality of spaced frames having aligned openings and means defining an annular recess in each of said frame openings,
 (b) resilient bearing retaining means positioned in said recesses of said frame openings, and
 (c) a plurality of bearings pivotally supported within each of said frame openings and supported by said resilient means whereby said elongated member is frictionless supported for movement by said bearings and whereby said resilient means prevent side loads to said elongated member to cause misalignment between each said bearings and said elongated member.
2. The structure for frictionless support of an elongated member as claimed in claim 1 wherein said resilient bearing retaining means comprises a pressure adjustable inflatable tube of a resilient material.
3. The structure as claimed in claim 2 wherein said bearings are air bearings provided with a groove at its back middle portion to complement with said tube so that pivotal support is provided for said air bearings.

4. A frictionless support system for a substantially vertically positioned shaft comprising in combination:
 (a) support means carrying two spaced frames having openings in concentric alignment,
 (b) a resilient tube disposed at each said frames inner periphery, and
 (c) a plurality of air bearings pivotally supported by said tube in circular spaced arrangement along said inner periphery whereby said shaft is frictionless supported for vertical and rotational movement by said air bearings and whereby said tube counteracts side loads to said shaft and prevents minor misalignment between each said air bearings and said shaft.
5. A frictionless support system as claimed in claim 4 wherein said resilient tube is provided with means to vary its resiliency.
6. An air bearing aligning system for supporting a vertical positioned movable shaft or the like, comprising in combination:
 (a) an upper and lower air bearing assembly supporting said shaft for rotational and vertical movement,
 (b) each said assembly having a plurality of air bearings, pivotally mounted on a means of resilient material mounted on a horizontal plane by support means,
 (c) said resilient means having a cavity containing pressurized fluid,
 (d) each said air bearings having a face side being concave and complementing with part of said shaft outside periphery, and
 (e) means to regulate said fluid pressure in said resilient means.
7. An air bearing aligning system as claimed in claim 6 wherein said resilient means comprises a valve connected to associated fluid containing pressure means.
8. An air bearing aligning system as claimed in claim 6 wherein said pivotal mounting of said air bearing is accomplished by a horizontal groove in each said air bearing's back side.
9. A support device allowing reciprocal and rotational frictionless movement to a vertically positioned shaft including means for maintaining self-centering and aligning, comprising in combination:
 (a) a plurality of vertically spaced assemblies being part of said support device,
 (b) each assembly surrounding said shaft and having a plurality of bearings facing said shaft periphery for movement thereof, and
 (c) said bearings pivotally mounted on an adjustable force loading resilient means disposed on a horizontal plane mounted in each said assembly.
10. A support device as claimed in claim 9, wherein said bearing comprises air bearings and said force loading resilient means comprises a resilient enclosure adapted for application of compressive forces thereto.

References Cited
UNITED STATES PATENTS
2,473,267  6/1949  Wightman _____ 308—184
1,595,744  8/1926  Trumpler _____ 308—73

FOREIGN PATENTS
908,232  4/1954  Germany.
578,318  6/1946  Great Britain.

MARTIN P. SCHWADRON, *Primary Examiner.*

F. SUSKO, *Assistant Examiner.*